May 5, 1925.
B. P. ROSS
1,536,935
FRUIT AND VEGETABLE DRIER
Filed June 28, 1923
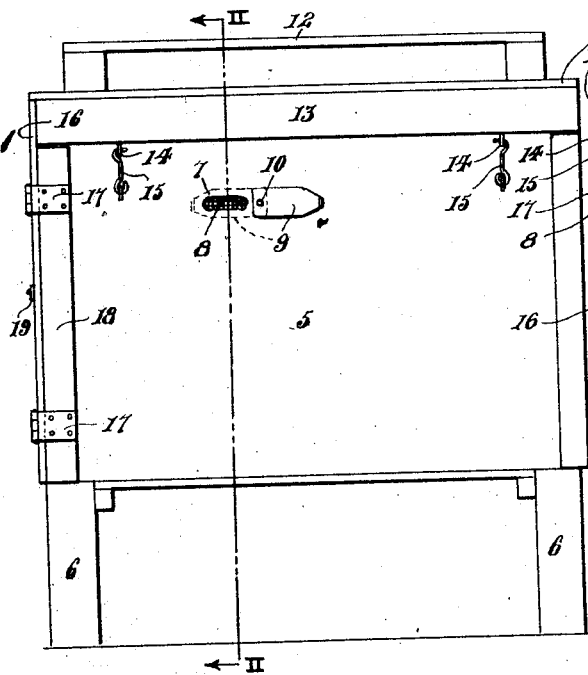
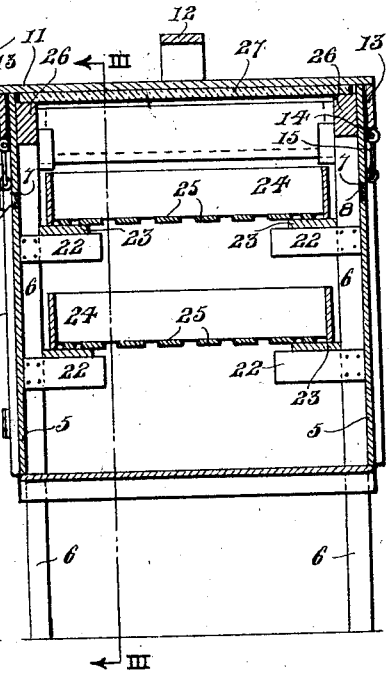
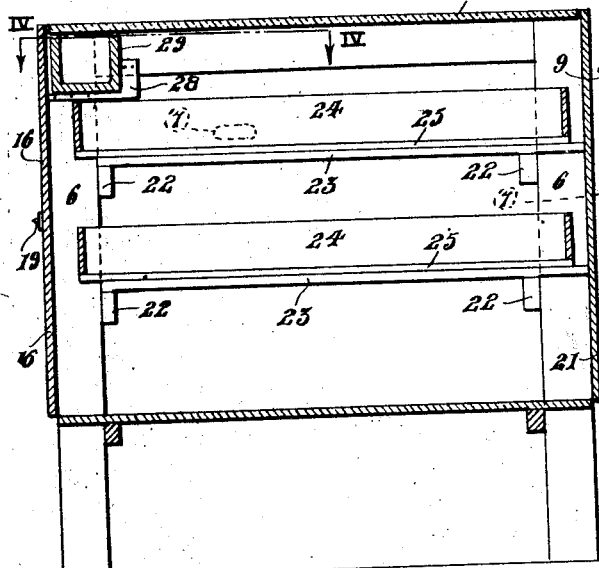
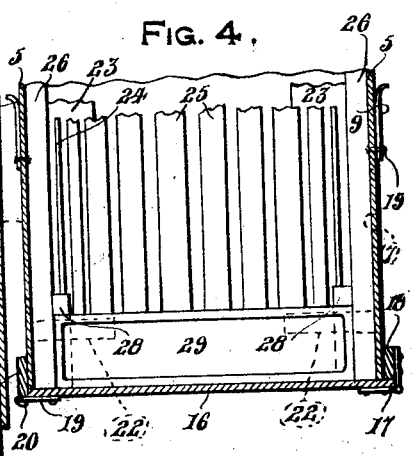
Inventor
Benjamin P. Ross
By
Attorney Patented May 5, 1925.

1,536,935

UNITED STATES PATENT OFFICE.

BENJAMIN P. ROSS, OF SACRAMENTO, CALIFORNIA.

FRUIT AND VEGETABLE DRIER.

Application filed June 28, 1923. Serial No. 648,380.

*To all whom it may concern:*

Be it known that I, BENJAMIN P. ROSS, a citizen of the United States of America, residing at Sacramento, in the county of Sacramento and State of California, have invented certain new and useful Improvements in Fruit and Vegetable Driers, of which the following is a specification.

This invention relates to improvements in fruit and vegetable driers.

An important object of this invention is to provide a fruit and vegetable drier in which means are provided that will prevent the too rapid drying of the fruit or vegetable being dried, and thus allow the fruit to retain to a great degree, its natural aroma and flavors.

Another object of this invention is to provide a device of the above mentioned character which may be easily and quickly transported from place to place.

A still further object of this invention is to provide a device of the above mentioned character which will be compact, insect-proof, strong and durable and one that may be easily manufactured.

Other objects and advantages of this invention will become apparent during the course of the following description, in which—

Figure 1 is a side elevational view of my fruit and vegetable drier, showing the same completely assembled.

Figure 2 is an end elevational view taken on line II—II of Fig. 1,

Figure 3 is a side elevational view showing the cover removed taken on line III—III of Fig. 2, and Figure 4 is a fragmentary plan view taken on line IV—IV of Fig. 3.

Referring to the drawing in which like reference characters designate like parts throughout the several views, the numeral 5 indicates the body portion of my fruit and vegetable drier, which is suitably mounted on legs 6 which extend upwardly and into the body portion 5 for a purpose to be more fully hereinafter described. Formed in both sides of the body portion 5 are air ventilation ports 7 which are covered by a fine wire gauze 8 to prevent the entrance of insects or the like, as clearly shown in Figs. 1 and 2. The openings 7 are adapted to be closed when desired by a shutter 9 pivoted as at 10.

The numeral 11 designates the auxiliary cover for the body portion 5 which is provided with a handle 12 to facilitate the carrying of the device when completely assembled. The cover 11 is further provided with downwardly depending side members 13, which are provided with eyes 14 adapted to be engaged by hook members 15 carried by the body portion 5, as clearly shown in Fig. 1.

A door 16 is mounted on hinges 17 carried by a strip 18 which is secured to the body portion 5. The door 16 is further provided with a hook 19 which is adapted to engage an eye 20 carried by a strip 21 which is also carried by the body portion 5, as clearly shown in Fig. 4. This door 16 facilitates the insertion or removal of fruit or vegetables to be dried, although not necessarily limited to the same as the fruit or vegetables to be dried could be removed through the top of the case.

Secured to the legs 6 are brackets or the like 22 which are adapted to support shelf members 23. Slidably mounted on the shelves 23 are trays 24 provided with slatted bottoms 25, a small open space being left between the slats to allow for free circulation of air. Removably mounted on shelf members 26 is a transparent top plate 27 which acts as a cover when the auxiliary cover 11 has been removed, and also allows the rays of the sun to reach the articles being dried.

Mounted on shelf members 28 is a removable tray 29 which is adapted to hold a small amount of water for a purpose which will be hereinafter more fully described. In the operation of my fruit and vegetable drier, the fruits or vegetables to be dried are placed in the trays and the trays are then inserted in the case. The door may then be fastened and the case carried into the sunlight by means of a handle 12, carried by the auxiliary cover 11. The auxiliary cover is then removed, and the sun's rays allowed to shine directly on the articles to be dried. In order to prevent too rapid drying of the articles in the trays, the tray 29 is filled with water which will itself become evaporated by the sun's rays in time, but it will cause a slow drying of the fruit or other articles so that when the drying operation is completed the fruit will have retained to a great extent its natural aroma and flavor.

It is to be understood that the form of my invention as herewith shown and described is to be taken as the preferred example of the same, but that various changes in the shape, size, and arrangement of parts may be resorted to without departing from the spirit of this invention or the scope of the subjoined claims.

Having thus described the invention, I claim:—

1. In a fruit drier, a rectangular frame having corner posts, brackets projecting laterally from said posts, shelves removably supported on said brackets, and trays having bottoms provided with longitudinal slots and resting on said shelves, said trays being adapted to rest directly on the brackets upon removal of the shelves, certain of the slots being closed by the shelves when the trays are supported in said shelves.

2. In a fruit drier, a rectangular frame having corner posts, brackets projecting laterally from said posts, shelves removably supported on said brackets, and trays having bottoms provided with longitudinal slots and resting on said shelves, said trays being adapted to rest directly on the brackets upon removal of the shelves, certain of the slots being closed by the shelves when the trays are supported in said shelves, a casing carried by the posts and spaced from the shelves and trays at one end to form an air flue, and a water trough extending across the casing over said flue and spaced slightly from the end and top of the casing to form a narrow air passage.

In testimony whereof I affix my signature.

BENJAMIN P. ROSS.